United States Patent [19]

Tabor et al.

[11] Patent Number: 4,803,586
[45] Date of Patent: Feb. 7, 1989

[54] VOLTAGE CONTROL MODULE

[75] Inventors: Jim Tabor; Richard Counts, both of Dallas, Tex.

[73] Assignee: Prescolite, Inc., San Leandro, Calif.

[21] Appl. No.: 126,422

[22] Filed: Nov. 30, 1987

Related U.S. Application Data

[63] Continuation of Ser. No. 886,904, Jul. 16, 1986, abandoned.

[51] Int. Cl.[4] .............................................. H02H 3/26
[52] U.S. Cl. ........................................ 361/18; 361/88;
307/117; 307/141; 315/291; 315/247;
315/DIG. 4; 323/300; 323/325
[58] Field of Search ..................... 361/18, 88; 307/116,
307/117, 125, 126, 130, 140, 141, 141.4, 127;
323/325, 326, 299, 300; 315/DIG. 4, 291, 247,
225, 206

[56] References Cited

U.S. PATENT DOCUMENTS

| | | | |
|---|---|---|---|
| 3,388,294 | 6/1968 | Davis | 315/194 |
| 3,846,824 | 11/1974 | Bell | 357/180 |
| 4,096,414 | 6/1978 | Howell | 315/291 |
| 4,144,478 | 3/1979 | Nuver | 315/361 |
| 4,167,786 | 9/1979 | Miller et al. | 364/493 |
| 4,242,614 | 12/1980 | Vatis et al. | 315/153 |
| 4,246,559 | 1/1981 | Budrose | 335/120 |
| 4,337,430 | 6/1982 | Flego | 323/325 X |
| 4,388,563 | 6/1983 | Hyltin | 315/205 |
| 4,388,567 | 6/1983 | Yamazaki et al. | 315/291 |
| 4,443,740 | 4/1984 | Goralnik | 315/284 |
| 4,493,002 | 1/1985 | Pelowski et al. | 307/125 X |
| 4,494,012 | 1/1985 | Coker | 307/141 X |
| 4,499,363 | 2/1985 | Izume et al. | 323/300 X |
| 4,523,128 | 6/1985 | Stamm et al. | 315/291 |
| 4,523,132 | 6/1985 | Christiansen et al. | 315/321 |
| 4,560,975 | 12/1985 | Jarva | 307/491 X |
| 4,565,935 | 1/1986 | Rolfe | 307/491 |
| 4,580,080 | 4/1986 | Smith | 323/300 X |

Primary Examiner—A. D. Pellinen
Assistant Examiner—Todd E. DeBoer
Attorney, Agent, or Firm—Bielen & Peterson

[57] ABSTRACT

A wall box mounted remotely operated voltage module utilizing a low voltage DC control signal which is remotely generated. A power semi conductor device is triggered to deliver a predetermined amount of power from the source of AC electrical power to a load. The AC electrical power is rectified and transformed to produce a low voltage rectified DC signal. A comparator generates a triggering signal to the power semi conductor utilizing the low voltage rectified DC signal and remotely generated low voltage DC control signal as imputs. The comparator also serves as a compensator for changes in the voltage of the AC electrical power from the source.

2 Claims, 4 Drawing Sheets

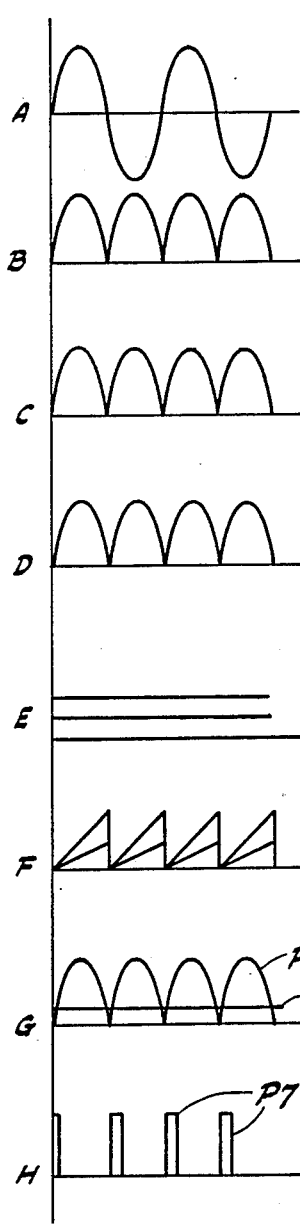
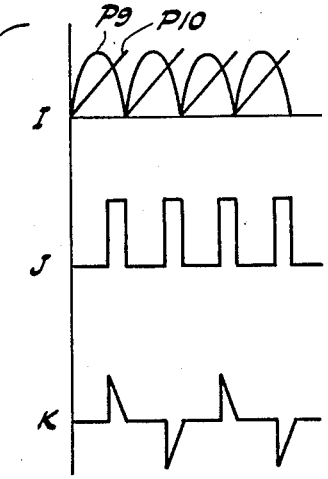
FIG. 5
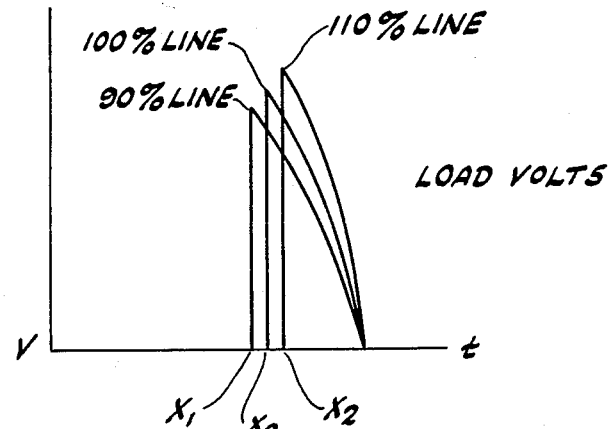
FIG. 6

VOLTAGE CONTROL MODULE

This is a continuation of application Ser. No. 886,904, filed July 16, 1986, now abandoned.

BACKGROUND OF THE INVENTION

The present invention relates to a novel voltage control module which may be mounted in a standard wall box.

Large scale dimming systems generally comprise a control panel having a series of levers or other operating members each connected to a potentiometer. A control signal, which is typically a steady DC signal, is sent to a dimmer module remotely located from the control panel. A dimmer module normally must be housed in a custom panel or electrical box which requires the provision of adequate space for the same. Also, the prior custom dimmer modules were expensive to manufacture and to install.

In addition, many facilities where lighting dimming is required entail a number of circuits with modest load requirements. Typical custom dimming enclosures used heretofore possessed a large capacity which far exceeded the requirements of these facilities. Consequently, the installation of existing lighting dimming equipment became uneconomical.

The provision of a compact dimmer or voltage control module which is mountable in a standard wall box would be a great advance in the lighting industry.

SUMMARY OF THE INVENTION

In accordance with the present invention a novel and useful voltage control module is provided.

The module of the present invention utilizes a housing which easily fits in a standard wall box. The housing contains circuitry which controls the passage of AC electrical power from a source, thereof, to a load such as a lamp, fan, motor, and the like. Such means for determining the quantity of power passing from the source of AC electrical power to the load may include a power semi-conductor which possesses power leads between the source and the load, heretofore described. Typically, power semi-conductors of this type have a gate for controlling the delivery of power from the source to the load using phase control through a triggering circuit.

The module of the present invention also employs means for rectifying the AC electrical power signal from the source and transforming the resultant pulsating DC signal to a lower voltage.

Comparitor means may be employed for generating an output signal for triggering the gate of the power semi-conductor in accordance with the low voltage pulsating DC signal and the remotely generated low voltage DC control signal. The comparator means further includes voltage compensation means for substantially maintaining the delivery of a constant quantity of power from the source to the load through the power semi-conductor with variations of the voltage of the AC electrical power from the source. In the case where the load is a lamp, the dimming level of the lamp would remain unchanged with fluctuations of the voltage of the AC electrical power source.

The module of the present invention also may be provided with an optically coupled semi-conductor device connected between the AC power source and the comparator. Also, another optically coupled semiconductor device may be connected between the output terminal of the comparator and the power semi-conductor. Thus, the comparator, which operates at low voltage, is effectively isolated from the high voltage portions of the electrical circuitry.

The voltage control module of the present invention may further include means for compensating the pulsating DC power signal for changes in the ambient temperature. The temperature compensation means may include a pair of optically coupled transistors having light emitting diode portions. Further, the light emitting diode portion of the first optically coupled transistor may be connected in parallel with the means for rectifying the source AC signal. The second optically coupled transistor light emitting diode portion is connected in series with the transistor of the first optically coupled transistor. Also, the transistor of the second optically coupled transistor could be connected in parallel with the light emitting diode of the first optically coupled transistor.

An offset diode may also be placed in series with the emitter of the transistor of the first optically coupled transistor. This offset diode would insure the proper reset of one of the comparator imputs during generation of the triggering signal.

A further aspect of the module of the present invention is the provision of a chassis having a front and rear portion. A magnetic breaker is mounted to the chassis herein and an indicator of the on-off state of the breaker is visible of the front portion of the chassis. The magnetic breaker extends to the rear portion of the chassis and serves to interrupt current flow from the AC electrical source to the load when a certain current level is exceeded.

It may be apparent that a novel and useful wall box mounted voltage control module has been described.

It is therefore an object of the present invention to provide a voltage control module which is sufficiently compact to fit within a standard wall box.

It is another object of the present invention to provide a voltage control module which utilizes remotely generated DC signals from a variety of control panels with or without demultiplexing.

Another object of the present invention is to provide a voltage control module which may be packaged alone or in combination with a group of like modules and is simple to install at a site.

Yet another object of the present invention is to provide a voltage control module which may be employed with incandescent, low voltage incandescent, fluorescent, or neon/cold cathode lighting and with a variety of motors.

Another object of the present invention is to provide a voltage control module which is durable and less susceptible to electronic interference than prior dimmer modules.

A further object of the present invention is to provide a voltage control module which utilizes a fully magnetic circuit breaker which has an illuminated accessible operator for mechanically overriding the magnetically operated on/off function of the breaker.

Yet another object of the present invention is to provide a voltage control module which includes a silent, electronic, on-off switching relay which controls the activation of the dimmer circuit in the module.

Another object of the present invention is to provide a voltage control module which includes voltage compensation means to eliminate flicker in lamps being dimmed by the module dimming circuit caused by source AC voltage fluctuations.

A further object of the present invention is to provide a voltage control module which includes temperature compensation means for eliminating load output variations caused by changes in the ambient temperature surrounding the module.

Another object of the present invention is to provide a voltage control module which possess high and low trim adjustment controls in the dimming circuit.

The invention possesses other objects and advantages especially as concerns particular characteristics and features thereof which will become apparent as the specification continues.

BRIEF DESCRIPTION OF THE DRAWINGS

FIG. 5 is a series of graph depicting signal characteristics at certain points in the schematic view shown in FIG. 4;

FIG. 6 is a graph indicating the voltage compensation feature of the present invention;

Figure 1:
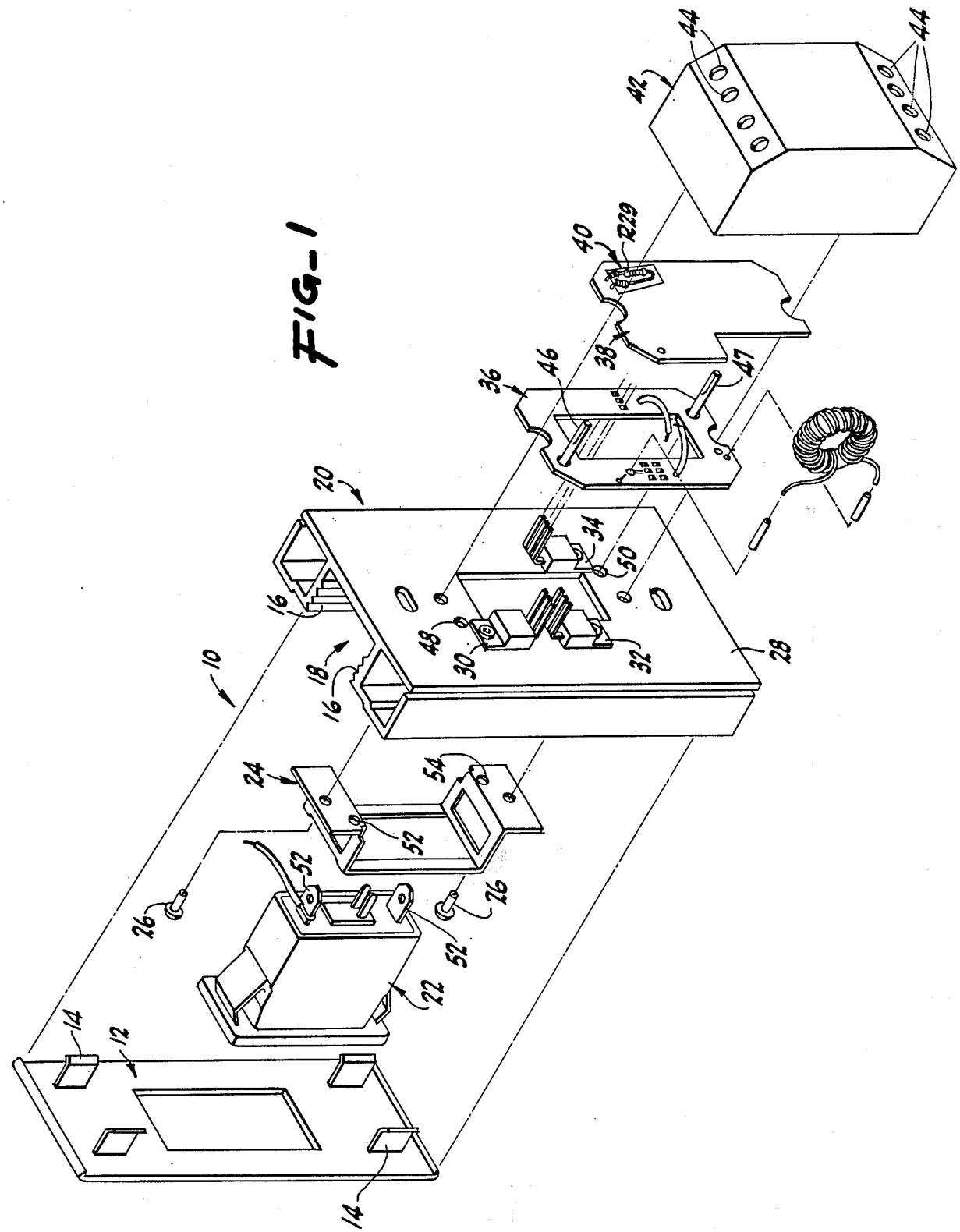
FIG. 1 is an exploded perspective view showing a physical embodiment of the present invention.

For a better understanding of the invention reference is made to the hereinafter description of the preferred embodiments of the present invention which should be referenced to the hereinabove described drawings.

DETAILED DESCRIPTION OF THE PREFERRED EMBODIMENTS

Various aspects of the present invention will evolve from the following detailed description of the preferred embodiments thereof which should be referenced to the hereinabove drawings.

The invention as a whole is represented in the drawings by reference character 10. The dimmer module or dimmer pack 10 includes a removable face plate 12 having a plurality of springy legs 14 which rest against the wall 16 of channel 18 found on heat sink body 20.

A magnetic circuit breaker 22 is mounted to stand-off 24 which is itself riveted to heat sink body 20 by the use of a pair of grovets 26. Heat sink body includes a rear surface 28 which serves as a mounting surface for SCR tabs 30 and 32 which aid in the mounting of SCR1 and SCR2 to surface 28. Likewise, tab 34 holds triac U2 to surface 28. Printed circuit boards 36 and 38 mount to tabs 30, 32, and 34 by solder or other fastening means. Various circuit components 40 are mounted to printed circuit boards 36 and 38, resistor R-29 being exemplar thereof. Choke 40 is also included for the suppression of RF1 interference, as is known in the art. Choke 40 is attached to printed circuit board 36 by solder or other fastening means. Back box 42 encloses the electrical and electronic components found on the rear surface 28 of heat sink body and on the printed circuit boards 36 and 38 which are also enclosed by back box 42. Plurality of openings 44 permit wires to extend to the exterior of back box 42. Adjustment tools 46 and 47 extend through openings and 50 of heat sink body 20 and openings 52 and 54 of standoff 24. Adjustment tools 46 and 47 are employed to permit manual adjustment of the high and low trim of the voltage controlling or dimming function of module 10. These adjustments are accessible by removal of face plate 12 from heat sink 20. It should be noted that magnetic circuit breaker 22 may be of the type sold as the AIRPAX 203 manufactured by AIRPLAX, Corp, Cambridge, Md. The terminals 52 of breaker 22 interconnect with appropriate conductors on printed circuit boards 30 and 32.

Figure 2:
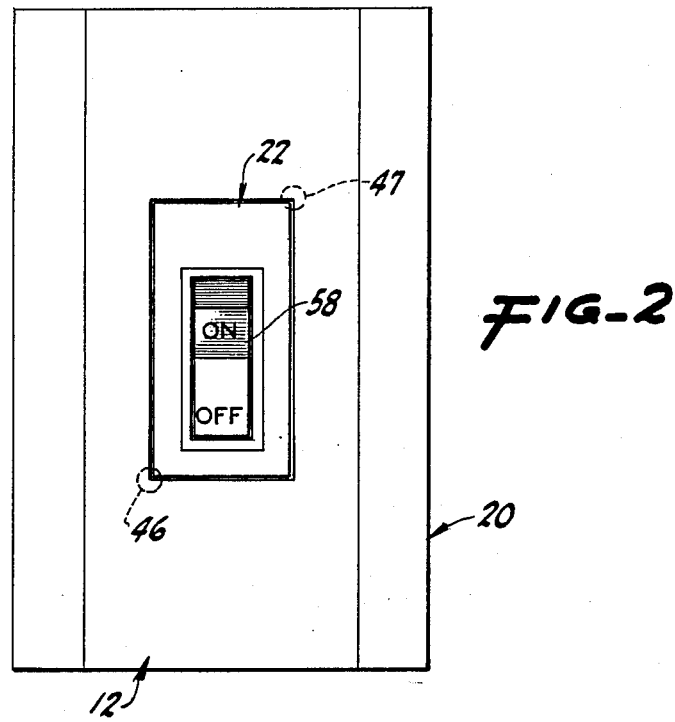
FIG. 2 is a front elevational view of the physical embodiment of the present invention of FIG. 1 in its assembled state.

With reference to FIG. 2, it may be apparent that circuit breaker 22 extends to the front portion 54 of heat sink body or chassis 20. Also, the circuit breaker 22 extends to the rear portion 26 of chassis 20 when assembled. Circuit breaker 22 includes operator 58 for mechanically turning the breaker "on" and "off". Operator 58 manually overrides the magnetically operated portion of the operator 22 and is illuminated, as will be discussed hereinafter.

Figure 3:
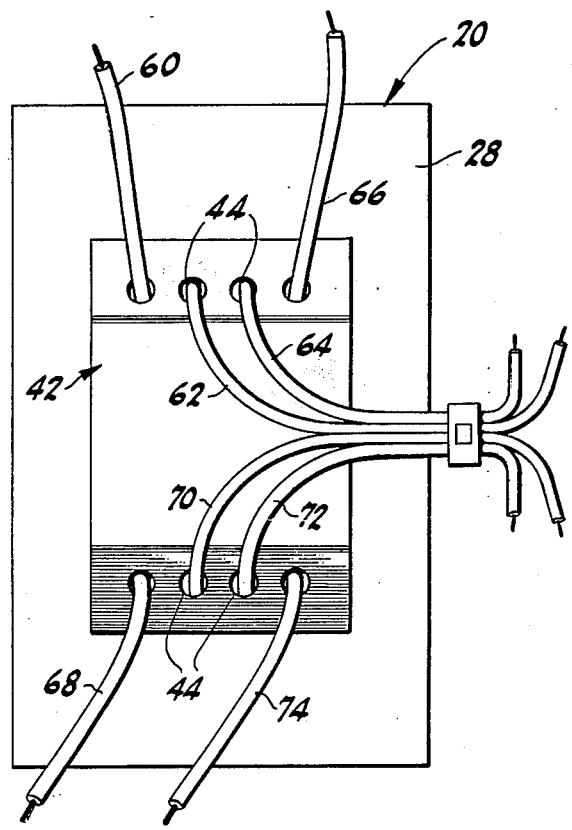
FIG. 3 is a rear elevational view of the present invention in its assembled state.

Turning attention to FIG. 3, rear surface 28 of chassis 20 is depicted. As heretofore discussed, backbox 42 includes a plurality of openings 44. Wires or conductors 60, 62, 64, 66, 68, 70, 72, and 74 extend through plurality of openings 44 for use in electrically wiring module 10 within a standard single gang wall box, standard in the industry. Conductors 62, 64., 70 and 72 represent low voltage DC wires while conductors 60, 66, 68 and 74 represent high voltage AC wires.

Figure 4:
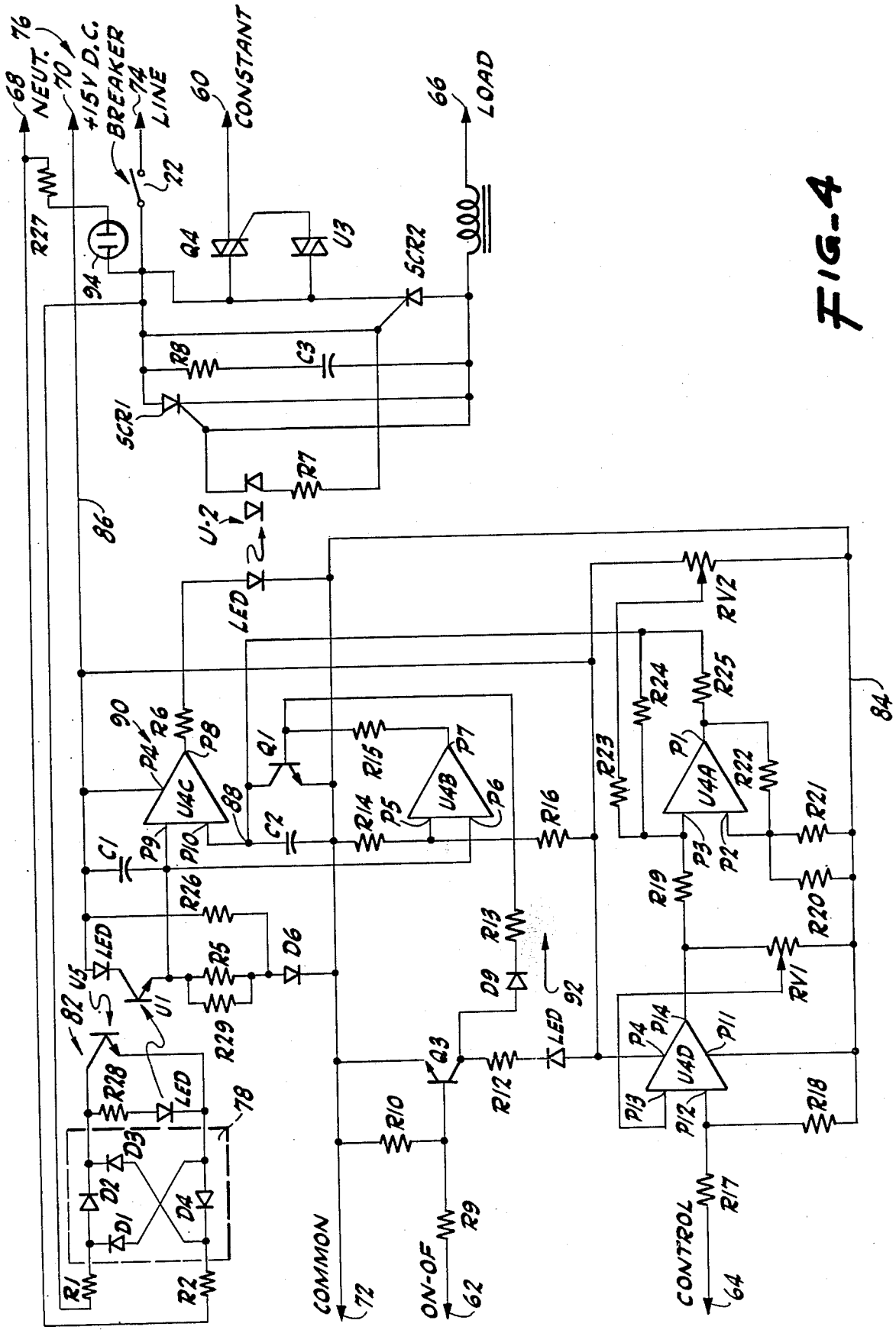
FIG. 4 is a schematic view of the circuit of the present invention.

With reference to FIG. 4, a circuit diagram is represented. The heretofore described conductors appearing in. FIG. 3 have been identified in FIG. 4 with indicia further clarifying the same.

Conductors 68 and 74 represent the NEUTRAL and LINE AC voltage conductors and constitute the source 76 of AC electrical power to module 10. Resistors R1 and R2 and diode bridge 78 having diodes D1, D2, D3, and D4 generate a full-wave rectified signal. Graph A, FIG. 5 represents the sine wave AC current across conductors 68 and 74. Graph B of FIG. 5 depicts the "camel hump" full-wave rectified signal coming from diode bridge 78.

It should be noted that the graphs shown in FIG. 5 are included to generally show the wave shapes encountered in the circuit shown in FIG. 4 and are not to be construed as accurately portraying voltage and time values.

U1 and U5 are optically coupled or opto-coupled transistors. The emitter current of the transistor of U1 is the same as the light emitting diode of transistor U-1 (LED) current multiplied by some gain. Graph C describes the emitter curren of U1. Graph D depicts the wave form of the voltage on R5. R5 includes the trim resistor R-29 to adjust the voltage across R5 as desired. The voltage flowing from the emitter of U-1 enters pin 9 of U4C which is a comparator. Thus, GRAPH D also represents the wave form found on pin 9 of comparator U4C. It should be noted that all pins will be designated by the letter "P", with a particular number, hereinafter. The voltage at P9 of comparator U4C generally ranges between 0 and 15 volts DC.

U5 is also an opto-coupled transistor whose LED portion is connected in series with the collector of transistor U1. The transistor portion of opto-coupled transistor U5 is connected in parallel with resistor R28 and the LED of opto-coupled transistor U1.

As the ambient temperature relative to module 10 varies, the amplitude of the signal from the emitter of transistor U-1 also varies. Generally, as temperature increases the voltage of the signal from U1 increases and vice-versa. However, the U5 transistor will compensate for temperature variations. For example, if the ambient temperature at device 10 increases, the U5 LED will increase its output as the U1 opto-coupled transistor current increases. The current through the transistor of U5 added to the current through R28 and the LED of opto-coupled transistor U1 will become a fixed value, e.g. 3 milliamps. As the current through the transistor of U5 increases a current through the LED of opto-coupled transistor U1 will decrease. Thus, through this feed back mechanism the emitter current of U1 decreases to a value existing prior to the temperature increase. Thus the U1 and U5 combination serves as means 82 for temperature compensation.

The CONTROL signal through conductor is generally a steady DC signal of some value; in the embodiment shown, between 0 and 15 volts. The CONTROL voltage is generated remotely from a dimmer or voltage control module (not shown) and may be demultiplexed, if the original signal is a digital signal. The control signal passes through limiting resistor R17 which is a part of a voltage divider formed therewith and with resistor R18. Resistor R18 is found in leg 84 which terminates in conductor 72, the COMMON lead of the DC power reference. It should be noted that conductor 70 leading into leg 86 serves as the supply voltage or "hot" DC lead. Conductors 70 and 72 originate with a DC lead power supply (not shown). In the embodiment shown, leg 86 is at a level of about 15 volts DC.

U4D is an operating amplifier having inputs at P12 and P13. P12 originates between resistors R17 and R18 while P13 comes from variable resistor RV1, the high trim adjustment for the module 10. Thus, the gain of U4D is RV1. P4 and P11 serve as the DC supply voltage and COMMON leads to U4D respectively. P14, the output of U4D, passes through gain setting resistor R19 and to P3 of U4A. U4A is a current generator also receiving an input at P2 from COMMON leg 84. Resistors R20, R21 and R22 are gain setting resistors. The output at P1 of U4A feeds back through R22 into P2. RV2 and parallel resistors R23 and R24 set the low trim for the resistor dimmer module 10. The output of current generator at P1 of U4A is proportional to the CONTROL signal through R17.

The DC signal from U4A is sent to node 88 and charges capacitor C2. Graph E of FIG. 6 depicts a typical variety of steady DC signals into capacitor C-2. Again, the constant DC current signals to capacitor C-2 are proportional to the CONTROL signal entering through conductor 64. Graph F, FIG. 6, depicts the typical ramps corresponding to the inputs to C-1, shown in Graph E. Thus, comparator U4C possesses inputs at P9 and P10 corresponding to the wave form shown in Graphs D and F. When the voltage of P9 is greater than P10, the output of comparator U4C, P8, equals zero. However, when P9 is less then P10, P8 goes to a certain DC voltage determined by P4, in the embodiment shown being 10 volts DC. Graph G represents the voltage at P5 and P6 of U4B. Graph H depicts the output, P7, of U4B i.e.: when the voltage at P6 exceeds the voltage at P5. Graph I, FIG. 6, depicts the input voltages at P9 and P10 to U4C. This DC current from P-8 passes to R6 and to the LED of U-2, an opto-coupled triac (switch). Graph J, FIG. 6, depicts the output of P8 of U4C as well as the configuration of the current to the LED of opto-coupled triac U-2. When P8 of U4C plateaus, capacitor C-2 is reset to zero. P9 of U4C also feeds into P6 of operational amplifier U4B. P5 of U4B connects to capacitor C2 and lies between voltage dividing resistors R14 and R16. When the voltage on P6 is less than the voltage on P5, P7 goes to a high value and travels the base of Q1 via resistor R15. At this point Q1 is turned "off" and capacitor C-2 may again charge. The values of resistor R14 and R16 are chosen to synchronize the resetting of capacitor C-2 with the zero crossing of the AC line frequency from source 76. Thus, U4B and Q1 serve as a portion of a reset circuit for capacitor C2.

The width of the plateau of the square wave form shown in Graph J, FIG. 5 depends on the steepness of the ramp of P10 entering comparator U4C. In turn, these signals are proportional to the CONTROL signal entering conductor 64, previously described. SCR1 and SCR2 serves as the positive and negative gate to LOAD which is a portion of conductor 66. The output of SCR1 and SCR2 to the LOAD is shown by Graph K. Where the load is a lamp, the light emanating from such a lamp will be less than its full intensity depending on the level of the CONTROL signal through conductor 64.

It should be noted that offset diode D6 insures that capacitor C2 is fully discharged when reset to zero, since a residual charge on C2 could cause full conduction of anti-parallel SCRs'1 and 2 and full conduction of the AC power to the load, thereby. R8 and C3 provide a snubber circuit which eliminates "noise" in the firing of SCR1 and SCR2.

Comparitor U4C also serves as a portion of means 90 for compensating for variations in the AC voltage across conductors 68 and 74. With reference to FIG. 6 it may be seen that LOAD voltages are depicted at 90%, 100% and 110% of LINE voltage from source 76. When the LINE voltage from source 76 increases the ramp from capacitor C2 crosses later in the half cycle of the signal at P9 of U4C. Thus, the "on" time of SCR1 and SCR2 is shorter, but the peak value of the voltage is higher. Conversely, at 90% LINE voltage from source 76, the ramp produced by capacitor C2 crosses the P9 waveform sooner in the half cycle. The "on" time of anti-parallel SCR1 and SCR2 is longer but the peak voltage value is less. The areas, beneath the graphs (representing the power to the LOAD) formed by each of the three wave forms depicted in FIG. 6, substantially equal each other. The symbols X1, X0, and X2 represent corresponding initiation times of the ramps produced by capacitor C2 at 90%, 100% and 100% values of LINE AC voltage, respectively.

Returning to FIG. 4 it may be seen that ON-OFF conductor 62 represents a DC control signal of a certain value which appears at current limiting resistor R9 by the actuation of a switch (not shown). When a current flows through R9 to the base of opto-coupled transistor U3, no current travels through diode D9 and R13 to the base of transistor Q1. Thus, the system for controlling the power to the LOAD functions according to the signal arriving at the CONTROL lead 64. R10 serves as a "cool down" resistor between the base and emitter of the transistor portion of U3. However, when no signal is fed through conductor 62, Q3 and R13 provide a predetermined DC signal to this base of Q1. With Q1 in the "on" condition, capacitor C2 is incapable of charging. Thus, comparator U4C is in the "off" condition. In addition, when Q3 is "on" the LED 92 passes a signal from the COMMON conductor 72 through current limiting resistor R12 to transistor U3. LED 92 is optically coupled to triac U3. Triac U3 U4 is then turned on to produce a constant AC voltage through conductor 60. Typically, this voltage is employed to feed a ballast in a fluorescent lighting fixture. However, conductor 60 may feed to other electrical units requiring a constant AC voltage.

Lamp 94 connects to conductor 68 via current limiting transistor R27. Lamp 94 illuminates operator 58 of magnetic circuit breaker 22. As heretofore discussed, the switch depicted in FIG. 4 may be operated magnetically when excessive current passes through conductor 74 or overridden mechanically by the use of operator 58.

In operation, module 10 is connected to a source 76 of AC voltage represented by conductors 68 and 74. A source of DC power is fed into module 10 though conductors 70 and 72 representing the DC voltage and COMMON leads. A CONTROL signal enters module 10 through conductor 64 from a remote source. Typically the CONTROL signal is a steady DC signal at a certain voltage. The CONTROL signal through the circuit depicted in FIG. 4 determines the power delivered to the LOAD through conductor 66 using a phase control technique with power semi-conductor SCR1 and SCR2. The circuit depicted in FIG. 4 includes means 82 to compensate for variations in ambient temperature as well as means 90 for compensating for variations in the AC voltage from source 76. Module 10, in part by the usage of opto-coupled transistors, has been miniaturized to fit in standard wall box. As heretofore noted, the CONTROL signal entering conductor 64 may be a demultiplexed digital signal, in which case a demultiplexer is required.

The following table lists typical values for the various components shown in FIG. 4.

TABLE 1

| C-1 | 0.1 mic.f |
|---|---|
| C-2 | 0.1 mic.f |
| C-3 | 0.047 mic.f |
| D-1 | 1N4148 |
| D-2 | 1N4148 |
| D-3 | 1N4148 |
| D-4 | 1N4148 |
| D-5 | 1N4148 |
| D-6 | 1N4148 |
| D-9 | 1N4148 |
| Q-1 | MPS 8097 (Motorola) |
| Q-3 | MPS 8097 |
| Q-4 | Q-2015 (Teccor) |
| R1 | 20 KOHM |
| R2 | 20 KOHM |
| R5 | 10 KOHM |
| R6 | 390 OHM |
| R7 | 100 OHM |
| R8 | 100 OHM |
| R9 | 10 KOHM |
| R10 | 1 MOHM |
| R12 | 390 OHM |
| R13 | 1 MOHM |
| R15 | 100 KOHM |
| R16 | 10 KOHM |
| R17 | 1 MOHM |
| R18 | 1 MOHM |
| R19 | 1 MOHM |
| R20 | 1 MOHM |
| R21 | 1 MOHM |
| R22 | 620 KOHM |
| R23 | 1 MOHM |
| R24 | 620 KOHM |
| R25 | 20 KOHM |
| R26 | 1 KOHM |
| R27 | 33 KOHM |
| R27 | 33 KOHM |
| R28 | 68 KOHM |
| R29 | Variable |
| RV-1 | 10 KOHM |
| RV-2 | 10 KOHM |
| SCR 1 | S112 (Teccor) |
| SCR 2 | S112 (Teccor) |
| U-1 | 4N37 |
| U-2 | MOC-3021 (Motorola) |

TABLE 1-continued

| U-3 | MOC-3021 (Motorola) |
|---|---|
| U-5 | 4N37 |
| U4A, U4B, U4C, U4D | Integ. Cir. LM 324 |

While in the foregoing embodiments of the present invention have been set forth in considerable detail for the purposes of making a complete disclosure of the invention, it may be apparent to those of skill in the art that numerous changes may be made in such detail without departing form the spirit and principles of the invention.

What is claimed is:

1. A wall box mounted remotely operated voltage control module utilizing a low voltage DC control signal to regulate the amount of electrical power transferred from a source of A.C. electrical power to a load comprising:

a. means used for rectifying the AC electrical power from the source thereof, to produce a relatively high voltage pulsation DC signal;
   b. means used for transforming the relatively high voltage pulsating DC signal to relatively low voltage pulsating DC signal;
   c. a power semiconductor having power leads between the source of AC electrical power and the load, and having a gate for controlling the quantity of power delivered from the source of AC electrical power to the load;
   d. comparator means used for generating an output signal for triggering said gate of said power semiconductor in accordance with said relatively low voltage pulsating DC signal and the low voltage DC control signal, said comparator means further comprising voltage compensation means used for substantially maintaining delivery of a constant quantity of power from the source to the load through said power semi-conductor during variations in the voltage of the AC electrical power from the source thereof, said means used for transforming includes an optically coupled semi-conductor device being connected between the source of AC electrical power and said comparator;
   e. another optically coupled semi-conductor device for triggering said power semi-conductor, said another optically coupled semi-conductor device being connected between the output terminal of said comparator and the power semi-conductor;
   f. relay means for on-off switching of said triggering signal from said comparator means;
   g. means for compensating said high voltage pulsating DC power signal for changes in ambient temperature relative to the wall box, said temperature compensation means including;
   a first optically coupled transistor including a light emitting diode portion, said light emitting diode portion of said first optically coupled transistor connected in parallel with said rectifying means; and
   a second optically coupled transistor including a light emitting diode portion, said light emitting diode portion of said second optically coupled transitor connected in series with said transistor of said first optically coupled transistor connected in parallel with said light emitting diode of said first optically coupled transistor.

2. The module of claim 1 which additionally comprises means for compensating said high voltage pulsating DC signal for changes in the voltage level of AC electrical power from the source of AC electrical power.

* * * * *